Figure 1:
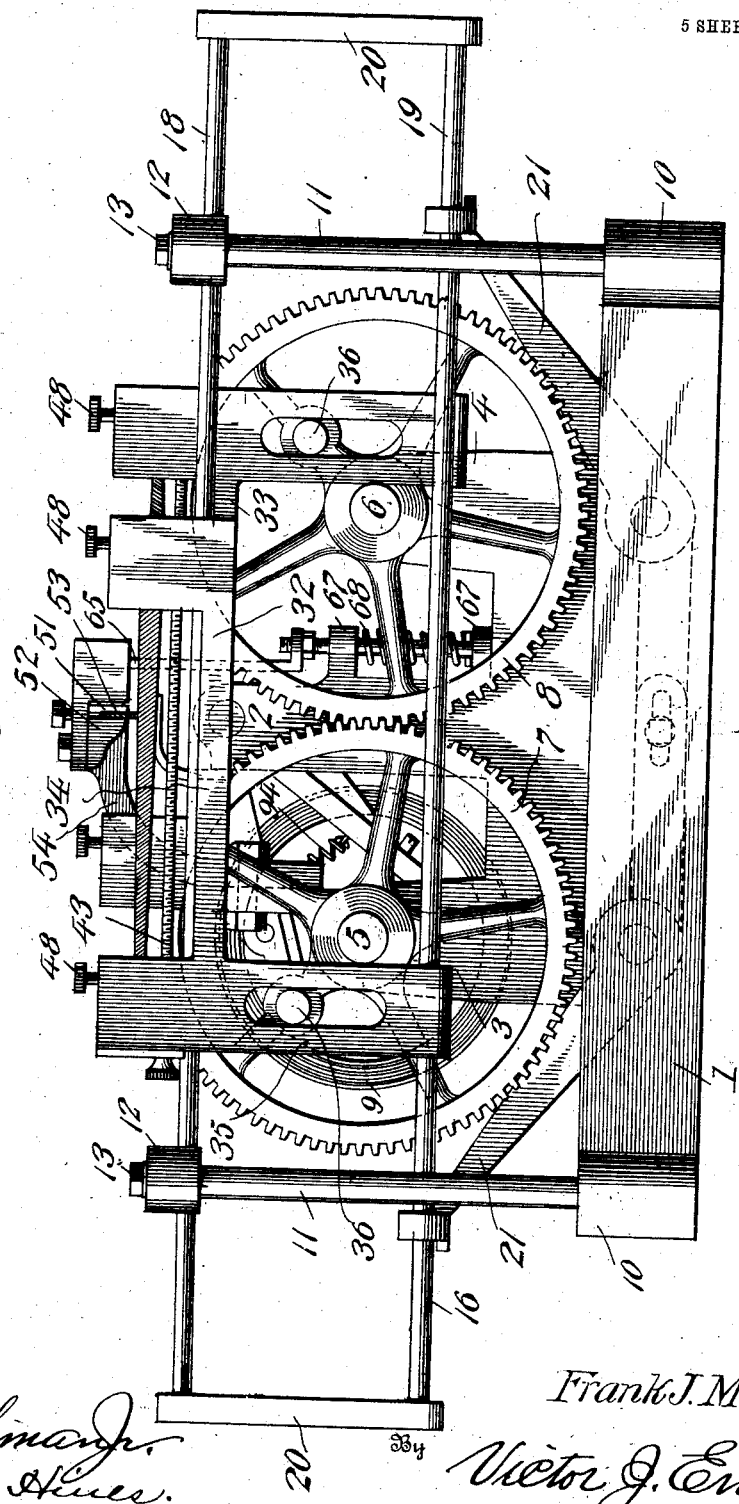

No. 853,988. PATENTED MAY 21, 1907.
F. J. MILLER.
SAW FILING APPARATUS.
APPLICATION FILED NOV. 11, 1905.

5 SHEETS—SHEET 1.

Witnesses
Geo. Ackman Jr.
C. C. Hines.

Inventor
Frank J. Miller,
By Victor J. Evans.
Attorney

No. 853,988. PATENTED MAY 21, 1907.
F. J. MILLER.
SAW FILING APPARATUS.
APPLICATION FILED NOV. 11, 1905.
5 SHEETS—SHEET 2.
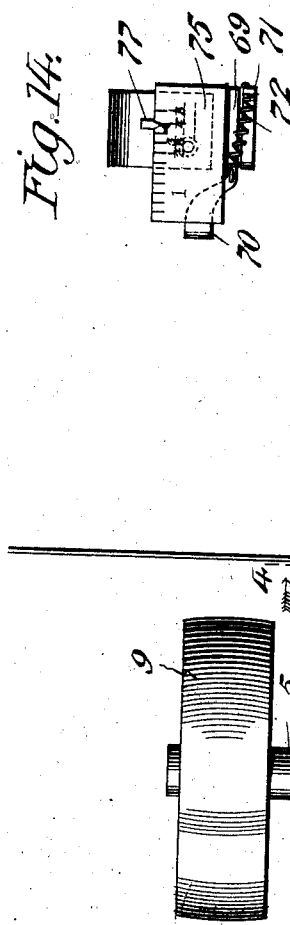
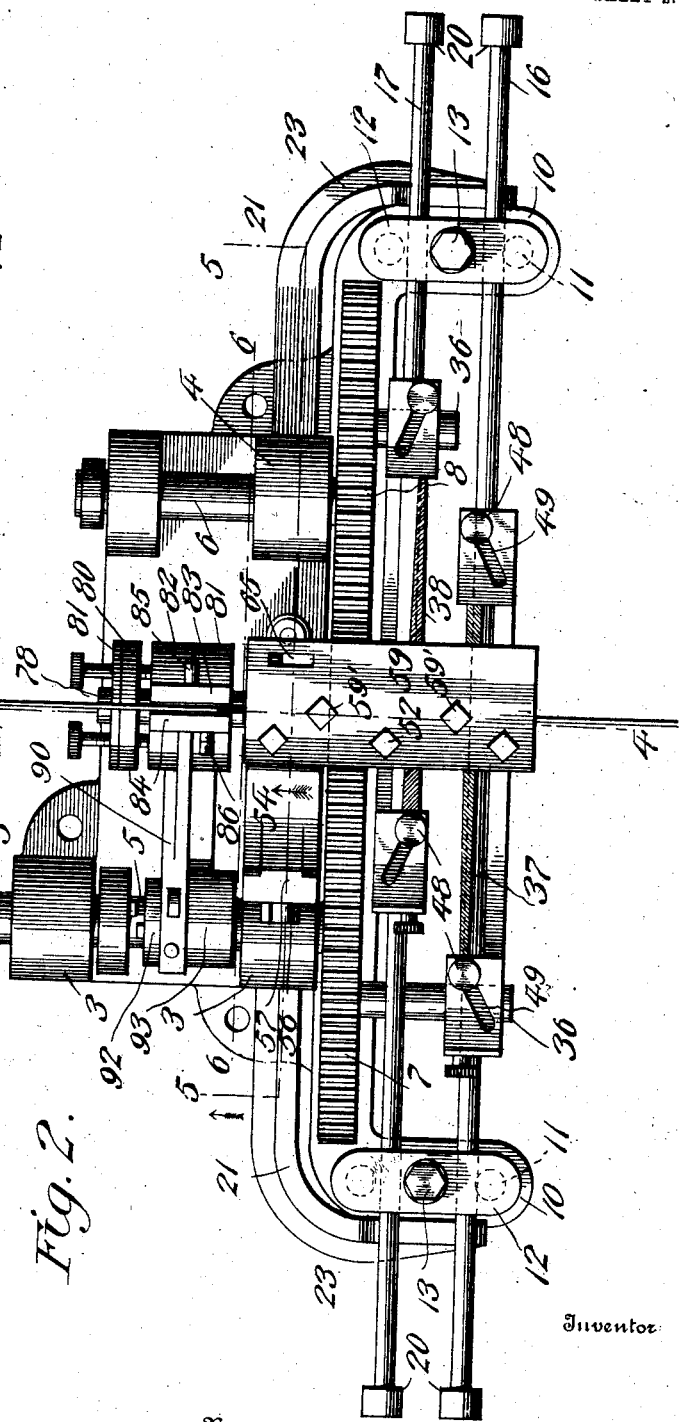
Witnesses
Geo Ackman Jr.
C. C. Hines
Inventor
Frank J. Miller,
By Victor J. Evans, Attorney

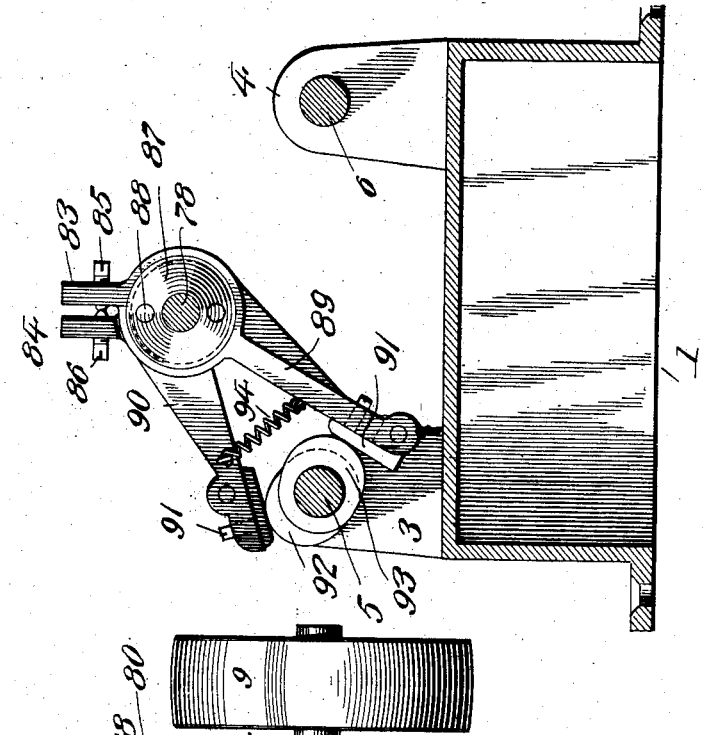

No. 853,988. PATENTED MAY 21, 1907.
F. J. MILLER.
SAW FILING APPARATUS.
APPLICATION FILED NOV. 11, 1905.
5 SHEETS—SHEET 4.
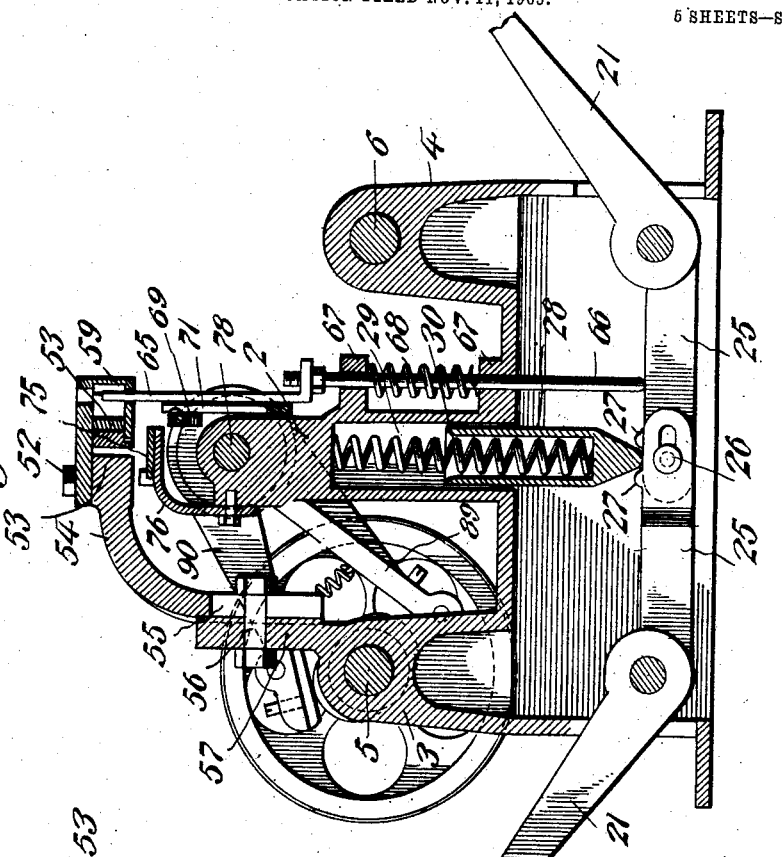
Witnesses
Inventor
Frank J. Miller
By Victor J. Evans.
Attorney No. 853,988. PATENTED MAY 21, 1907.
F. J. MILLER.
SAW FILING APPARATUS.
APPLICATION FILED NOV. 11, 1905.
5 SHEETS—SHEET 5.
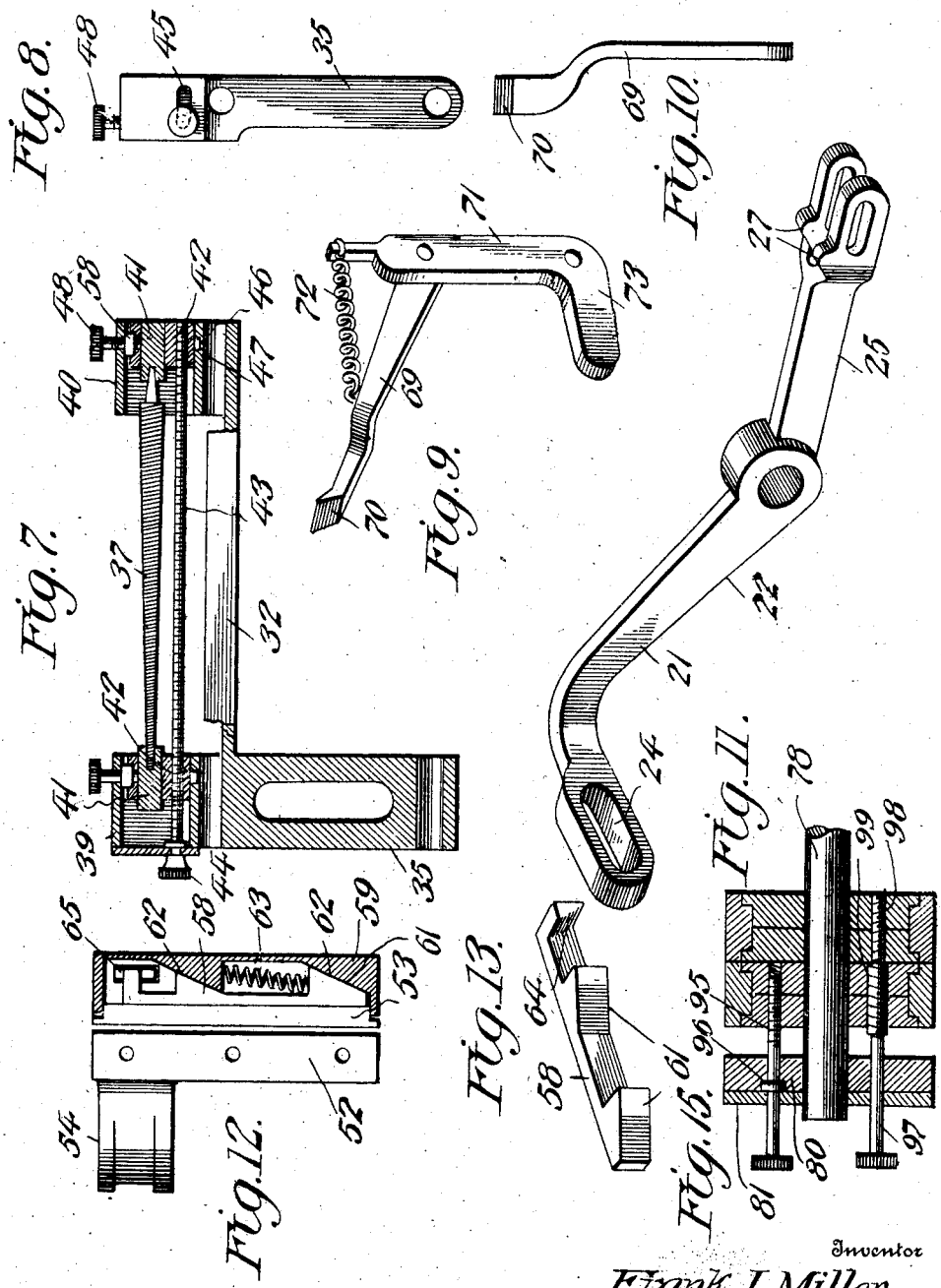
Witnesses
Geo Ackman Jr.
C. C. Hines
Inventor
Frank J. Miller,
By Victor J. Evans.
Attorney

UNITED STATES PATENT OFFICE.

FRANK J. MILLER, OF WILLIAMSPORT, PENNSYLVANIA.

SAW-FILING APPARATUS.

No. 853,988.      Specification of Letters Patent.      Patented May 21, 1907.

Application filed November 11, 1905. Serial No. 286,877.

*To all whom it may concern:*

Be it known that I, FRANK J. MILLER, a citizen of the United States of America, residing at Williamsport, in the county of Lycoming and State of Pennsylvania, have invented new and useful Improvements in Saw-Filing Apparatus, of which the following is a specification.

This invention relates to certain new and useful improvements in saw filing apparatus.

The main object of the invention is to provide a machine by which saws may be expeditiously filed, and by which saws may be filed and set at a single operation and automatically fed through the machine to successively bring the teeth thereof in position to be acted upon and which is particularly designed for filing and setting the teeth of band saws.

A further object of the invention is to provide a machine of this character which is adapted for straightening saws and wherein the saw filing, saw feeding and saw tooth setting and saw straightening devices may be adjusted for operation upon different sizes of saws.

With the above and other objects in view, the invention consists of the novel construction and combination of parts hereinafter fully described and claimed, reference being had to the accompanying drawings, in which:

Figure 1 is a front elevation of a saw filing and setting machine embodying my invention. Fig. 2 is a top plan view thereof. Fig. 3 is an end elevation. Figs. 4 and 5 are, respectively, vertical transverse and vertical longitudinal sections taken on the lines 4—4 and 5—5 of Fig. 2. Fig. 6 is a detail section on the line 6—6 of Fig. 2, showing the setting mechanism and actuating means therefor. Fig. 7 is a vertical longitudinal section through one of the file holders. Fig. 8 is an end elevation thereof. Fig. 9 is a detail view of the feed dog and its supporting lever. Fig. 10 is a plan view of the feed dog. Fig. 11 is a detail view of one of the carriage supporting levers. Fig. 12 is a horizontal sectional view through the carrier of the movable saw clamping jaw, and a plan view of the movable and fixed jaws. Fig. 13 is a detail view of the slide bar which actuates the movable jaw. Fig. 14 is a top plan view of the feed dog and coöperating parts, showing the gage plate by which the throw of the dog is regulated. Fig. 15 is a detail sectional view through the heads and bushings of the setting hammers, showing the adjusting means therefor.

Referring now more particularly to the drawings, the numeral 1 designates a suitable supporting base or foundation, which is hollow or chambered, as shown, and from which rises a central standard 2, on opposite sides of which and at the opposite end of the base are arranged hollow blocks or bearing bosses 3 and 4. Journaled in these bosses are shafts 5 and 6 carrying at their forward ends intermeshing gears 7 and 8. The shaft 5 carries at its rear end a band pulley 9 for the reception of a drive belt, whereby motion may be communicated thereto from any suitable source of power.

The base is provided at its ends with forwardly projecting extensions 10 in which are fixed the lower ends of guide rods 11, three such rods being mounted upon each extension and coupled at their upper ends by a head plate 12 which may be fastened in position by a nut 13 threaded on to the upper end of the central rod.

The rods 11 are spaced in parallel relation to respectively form vertical guides 14 and 15 for a pair of vertically movable carriages 16 and 17, each of which is formed of upper and lower horizontal parallel guide rods or bars 18 and 19 connected at their extremities by vertical end pieces 20. The two carriages are mounted upon normally divergently arranged supporting levers 21 movable in and projecting outwardly through slots 22 in the base, said levers having forwardly bent or curved outer ends 23 which are normally horizontally disposed and slotted, as shown at 24, to slidably receive and engage the lower rods 19 of the carriages.

The lower ends of the levers are pivotally connected within the base to the outer ends of a pair of links 25, the inner ends of which have a pin and slot connection 26 to adapt them to have free movement in a vertical plane and are formed with guide studs 27 between which fits the lower beveled or tapered end of a vertically movable plunger 28 slidable in a socket 29 formed in the lower portion of the standard 2. The plunger is hollowed or chambered to receive the lower end of a coiled spring 30 which bears at its upper end against the upper wall of the socket 29 and tends to force the plunger downward. Through the action of this spring the inner ends of the links 25 are normally forced downward and the links held in a horizontal position, as shown in Fig. 5, thus supporting the levers 21 in the relation shown in Fig. 1 to hold the carriages elevated, the upper rods of the carriages fitting when said carriages are in elevated position in receiving recesses 31 formed in the head plates 12, and said rods serve as guides and supports for a pair of reciprocating file holders 32 and 33. The recesses 31, which are formed in the lower edges of the head plates 12, are of less width than the guide slots 14 and 15 and are adapted to snugly receive the upper rods of the carriages, whereby the latter will be guided in a true plane and held from lateral motion on their working stroke. Each of these file holders comprises a horizontally disposed longitudinal body portion 34 provided at one end with a depending slotted arm 35, which fits and slides upon a pin or stud 36 eccentrically mounted upon the adjacent drive gear 7 or 8. The arms 35 of the two file holders are disposed at the far end of their respective holders and are respectively engaged by the pins or studs upon the intermeshing drive gears 7 and 8. The file holders are provided with longitudinal passages for the guide rods 18 of the carriages 16 and 17 on which they respectively slide, and the lower ends of the slotted arms 35 are preferably slidably mounted upon the lower rods 19 of said carriages in order to secure a more effective supporting and guiding action.

In the operation of the apparatus, the gears 7 and 8 are driven in reverse directions and impart corresponding reciprocatory motion to the file holders which move past one another and in parallel relation. When the holders reach the limit of their outward movement the pins or studs 36 engage the lower end walls of the slots in the arms 35 and exert a downward pressure thereon, whereby, as the file holders themselves are held from independent downward movement, the carriages 16 and 17 will be depressed, the levers 21 tilting downwardly and the inner ends of the links 25 upwardly against the pressure of the spring 30 to accommodate such movement. This action is performed at the limits of the cutting strokes of the files to throw the files downward and out of engagement with the teeth of the saw, so that upon the reverse or inward movements of the file holders the files will not act upon the teeth. As the studs 16 begin to ascend in the ensuing course of revolution of the gears, they will move to a limited extent in the slots of the arms 35 without imparting movement to said arms, thus permitting the spring 30 to react and restore the carriages to their normal position, thus resetting the files for a cutting operation on the succeeding outward movements of the file holders.

The files 37 and 38 carried by the respective holders 32 and 33 move in parallel planes in opposite directions to act upon adjacent teeth of the saw and are adjustably mounted so that they may be moved toward and from each other to operate upon saws having teeth of different sizes or spaced different distances apart. To this end each file is supported and adjustably mounted in its file holder, as follows: Each file holder is provided with a pair of vertical extensions 39 and 40 disposed at the opposite ends thereof and chambered for the reception of file supporting blocks 41 which are respectively recessed at their ends to receive the tang and tip portions of the file. The blocks 41 are slidably mounted in carrier blocks 42 having slots therein to adjustably receive the same, and the two supporting blocks are connected by an adjusting screw 43 having its head 44 swiveled at one end in the extension 39 and also slidable laterally in a slot 45 therein. The blocks 42 are provided at their lower ends with pins 46 slidable in diagonal guide grooves 47, and are adapted to be clamped in adjusted position by set screws 48 adjustable in diagonal slots 49 formed in the upper walls of the extensions 39 and 40. The stem of each set screw engages a threaded opening in the top of the block 42 and is adapted to impinge against the block 41 to clamp the latter in position, and on said stem is a nut 50 turning in a countersink in the upper face of the block 42. When the screw 48 is turned in one direction the lower end of its stem will be forced in clamping engagement with the block 41, while the nut 50 will be drawn into clamping engagement with the upper wall of the chambered extension, thus locking both blocks from movement. A reverse movement of the screw will withdraw it from engagement with the block 41 and move the nut 50 out of engagement with the extension, thus releasing the blocks. Upon releasing the set screws 48 and turning the screw 43 in one direction or the other it will be understood that the carrier blocks will be adjusted in a common direction simultaneously, and that owing to the fact that the pins 46 and screws 48 fit within correspondingly arranged diagonal grooves and slots, it will be readily understood that the blocks may be simultaneously adjusted toward or from the front of the frame to adjust each file toward or from the other file, and that then by tightening the screw the file will be clamped firmly in adjusted position. The diagonal guide grooves and slots of the two file holders project in reverse directions, as clearly indicated in Fig. 2, whereby one or both may be adjusted to space them a greater or less distance apart. The action of the oppositely reciprocating files on the teeth of the saw will be readily understood from the foregoing description.

The saw 51 is held and feeds in a plane at right angles to the path of movement of the files or from rear to front of the machine and is clamped in position between stationary and movable jaws 52 and 53. The jaw 52 is carried by a curved supporting arm 54 slotted at its lower end, as shown at 55, for the passage of a bolt 56 adjustably fastening it to an extension 57 projecting upward from one of the bearing bosses 3. The movable jaw 53 is operatively connected to or engaged by an actuating bar 58 slidably mounted in a chambered carrier 59 having a top plate or flange 60 bolted to the arm 54. The bar 58 is provided with inclined faces 61 bearing against inclined surfaces 62 formed in the carrier and is adapted to be moved in one direction to project the movable jaw by a spring 63. The arrangement of the inclined surfaces is such that when the bar moves forward it will be simultaneously adjusted laterally to move the jaw 53 toward the jaw 52 and clamp the saw against the same. At the rear end of the bar 58 is formed a lug 64 having an inclined surface adapted to be engaged by the beveled upper end of a vertically movable releasing bar 65 movable in a slot in the carrier 59. On its upward movement the beveled end of this retracting bar engages the beveled surface of the lug 64 and moves the bar 58 rearwardly against the resistance of the spring 63, thus retracting the jaw 53 to release the saw and permit the same to be fed forward for the action of the files upon the succeeding teeth.

The bar 65 is secured to the upper end of a rod 66 connected at its lower end to one of the links 25 and arranged to move in spaced guides 67 alongside the standard 2, between which guides is interposed a spring 68 surrounding the rod and secured at one end thereto and bearing at its upper end against the upper guide. When the file holders reach the limit of their active movement and the carriages are depressed by the action of the studs 36 on the gear wheels 7 and 8 and the links 25 are thereby elevated, the rod 66 will be forced upward against the resistance of the spring 68 and release the saw in the manner described, and when the studs withdraw pressure the spring 68 will coöperate with the spring 30 to retract the releasing bar 65 and restore the links and carriage supporting levers to their normal elevated position.

It will thus be understood that upon the retractive stroke of the file holders, in which the files move below the plane of the toothed edge of the saw, the movable clamp will be held retracted, thus permitting the saw to be fed forward to bring the succeeding teeth into position to be acted upon by the files on their succeeding cutting stroke, and that immediately upon the restoration of the holders to their elevated position ready to begin the active stroke, the movable jaw 53 will be projected by the action of the spring 63 to again clamp the file. This operation is successively carried out until the entire toothed surface of the saw has been treated.

A feed dog or pawl 69 having an engaging tooth 70 is provided to intermittently engage the teeth of the saw and feed the same forward. This pawl is pivotally mounted upon the upper end of a supporting and actuating lever 71 and is normally projected upwardly by a spring 72. The lever 71 is pivoted at its lower end to the releasing bar 65 and has an angularly extending arm 73 projecting at its free end between retaining pins 74 carried by the standard 2, whereby as the bar 65 moves upwardly and downwardly the lever will be swung forwardly and rearwardly to project and retract the pawl. In its forward movement the tooth of the pawl will engage one of the teeth of the saw and force the saw forward, and upon its rearward movement the tooth of the dog will ride over the teeth of the saw and engage another tooth ready to feed the saw forward again. The dog will be actuated at the time the movable clamping jaw is retracted to feed the saw forward, as will be readily understood. In order to regulate the movement of the dog and the extent of forward movement of the saw thereby a gage or stop plate 75 is provided and slidably mounted upon a supporting arm 76 fixed to the standard 2. The forward edge of this plate overhangs the toothed end of the pawl and limits the upward and rearward movement thereof. By sliding this plate backward or forward, it will be apparent that the extent of upward and rearward movement of the pawl may be regulated to adapt the same to feed the saw a greater or less distance. If desired, the plate 75 may be provided with gage marks, and a fixed pointer 77 may be employed to coöperate therewith, as clearly shown in Fig. 14, to adapt the plate to be adjusted with accuracy to allow the pawl to feed the saw the required distance according to the size and spaces between the adjacent teeth of saws having cutting teeth of different dimensions.

Extending rearwardly from the post or standard 2 is a fixed spindle 78 on the outer end of which is keyed or fixed, as by a set screw 79, a head 80 to the outer face of which is secured a disk 81, and between this head and the stem are disposed collars or heads 81 and 82 having suitable bracket plates or projections 83 and 84 carrying setting pins or hammers 85 and 86. Each collar or head is mounted to turn upon a bushing composed of a pair of disks 87 connected by screws or similar fastenings 88. Each bushing is annularly grooved to receive a projection upon the collar to retain the latter in connection therewith, and the two collars or heads 81 and 82 carry arms 89 and 90 carrying shoes or wipers 91 engaging cams 92 and 93 fixed upon the shaft 5 and having their acting portions projecting beyond diametrically opposite sides of said shaft to simultaneously force the arms apart and thereby swing the collars or heads to throw the setting pins in opposite directions across the path of movement of the saw to set adjacent oppositely projecting teeth thereof simultaneously. The arms 89 and 90 are normally drawn together by a spring 94 which acts to reversely swing the collars or heads and retract the setting pins when the acting portions of the cams move out of engagement with the shoes. The bushings are slidably mounted upon the spindle 78 to properly position the setting hammers thereon, and are adapted to be moved in one direction or the other in unison by an adjusting screw 95 having a threaded portion engaging the bushing of the collar 81 and a smooth surface portion extending through the head 80 and disk 81 and provided with a head or projection 96 swiveled between the same and serving to hold the screw from longitudinal movement. In order to adjust the collars or heads toward and from one another to position the setting hammers for operation upon teeth set a greater or less distance apart, an adjusting screw 97 is provided. This screw is slidably and revolubly mounted in the head 80 and disk 81 and is provided with right and left threaded portions 98 and 99 engaging correspondingly threaded openings in the bushings of the heads 81 and 82, respectively, whereby upon turning said screw in one direction or the other the heads may be drawn together or forced apart for the purpose described. It will, of course, be apparent that in the operation of the machine the cams 92 and 93 will be properly arranged upon the drive shaft 5 to throw the setting hammers into action at the time the saw is clamped and while the files are acting upon the teeth thereof. The brackets 83 and 84 form a guide for the saw and opposite anvil faces against which the teeth are spread, as will be readily understood. They also serve as hammer dies whereby the saw body or blade of the saw, if bent, will be straightened out as the teeth are set. Should it be desired to straighten a saw without either filing or setting, the setting punches are adjusted out of operative position or removed and the files removed, whereupon the members 83 and 84 will operate to straighten the saw as it is fed through. This operation may be carried out to straighten a bent saw which does not require filing or setting. Upon readjusting the setting punches or reapplying them, in case they are removed, and reapplying the files, the machine will again be ready for sharpening and setting.

Set screws 59' may be provided upon the saw holder 59 to engage the back edge of the saw, thus adapting the holder for the reception of saws of different widths and the adjustments of the saws with respect to the plane of movement of the cutting files, as will be readily understood.

The construction and mode of operation of the invention will, it is thought, be readily understood from the foregoing description, taken in connection with the accompanying drawings, and its manifold advantages appreciated.

Having thus described the invention, what is claimed as new, is:—

1. In a saw filing apparatus, the combination of a frame having an elevated file support, vertically arranged carriages movably mounted below said support, yielding supporting means for the carriages adapting the same to have movement toward and from the support, file holders mounted to reciprocate in opposite directions upon and relative to the carriages, and intermeshing gears having cranks engaging the file holders for imparting reciprocatory motion thereto, said gears being operatively connected with the file holders to depress the carriages on the return stroke, whereby the file holders will be retracted in a plane below the toothed edge of the saw.

2. In a saw filing apparatus, the combination with a file support, of vertically moving carriages, oppositely reciprocable file holders arranged to slide thereon and provided with vertically slotted arms, spring means for yieldingly supporting the vertically movable carriages and restoring the same to normal position, and intermeshing oppositely rotating gear wheels provided with cranks acting in said slotted arms to reciprocate the carriages and depress the same for movement in a lowered plane on their return stroke.

3. In a saw filing apparatus, the combination of a saw support, carriages arranged below said support, said carriages being mounted for movement in a vertical plane toward and from the saw support, levers supporting the carriages, spring actuated means acting on said levers for normally holding the carriages in working position, file holders mounted to reciprocate in opposite directions in fixed planes upon and with relation to the carriages, drive gearing for reciprocating the file holders, and crank mechanism actuated by the drive gearing for depressing the carriages against the resistance of said spring supporting means and holding the same depressed on the return stroke of the file holders.

4. In a saw filing apparatus, the combination with a saw support, of vertically movable carriages, file holders slidably mounted upon said carriages and carrying files to operate upon the saw, levers pivotally supporting the carriages to move in a vertical plane, interconnected links attached to said levers, a spring acting on the links to permit depression of the carriages and to restore the same to normal position, and crank mechanism actuated by the drive gearing for reciprocating the file holders in opposite directions and depressing the carriages on the return strokes of said file holders.

5. In a saw filing apparatus, the combination of a frame, a saw support carried thereby, carriages vertically movable upon the frame, file holders arranged to reciprocate in opposite directions upon said carriages, levers for supporting the carriages, interconnecting links attached to said levers, a spring acting upon the links for supporting the carriages and returning them after depression to their normal position, and oppositely rotating intermeshing gears provided with crank pins engaging slotted portions of the file holders to impart reciprocatory movement thereto and to depress said file holders and carriages at the limit of the out strokes of said carriages and to hold them depressed on their return movements.

6. In a saw filing apparatus, the combination of saw guiding and clamping means, saw feeding means operative upon the retraction of said clamping means, saw filing means, a yielding support therefor, means actuated by said support for controlling the saw clamping and feeding mechanism, and means for operating said saw filing means and moving said support to simultaneously actuate the saw feeding means and throw the saw filing means out of operative position upon the return stroke.

7. In a saw filing apparatus, the combination of saw guiding and clamping means, saw feeding means operative upon the retraction of said clamping means, saw filing means, a spring-controlled support therefor, means actuated by said spring-controlled support to govern the action of the saw clamping and feeding means, and means for operating said saw filing means and moving said support to simultaneously actuate the saw feeding means and throwing the saw filing means out of operative position upon the return stroke.

8. In a saw filing apparatus, the combination of a saw guide having an automatically projected clamping jaw, a saw feeding device operative upon the retraction of said jaw, an intermittently movable jaw retracting device, saw filing means, a spring-controlled support therefor, means actuated by said support for operating said jaw retracting device and imparting motion to the saw feeding device, and means for operating said saw filing means and moving said support to simultaneously actuate the saw feeding device to throw the saw filing means out of operative position upon the return stroke.

9. In a saw filing apparatus, the combination of saw guiding and clamping means, saw feeding means, said clamping and feeding means being connected for simultaneous movement, whereby one is retracted upon the projection of the other, saw filing means embodying a movable support operative to adjust the files into and out of filing position, and means actuated by said movable support for operating said saw clamping and feeding means.

10. In a saw filing apparatus, the combination of a saw support having a fixed and a sliding jaw, a saw feeder, a controlling device therefor operative to alternately project and retract said feeder and sliding clamping jaw, saw filing mechanism, and means actuated by said mechanism for operating said controlling device.

11. In a saw filing apparatus, the combination of a saw support provided with a stationary and a sliding clamping jaw, a device for operating said jaw, a feed dog pivotally mounted upon said operating device, means for actuating said dog upon the movement of said device, saw filing means, and means actuated by said saw filing means for actuating said operating device.

12. In a saw filing apparatus, the combination of a frame having a saw support provided with a stationary jaw and a holder, a sliding jaw movable in said holder toward and from the stationary jaw, inclined projections upon the holder and sliding jaw for retracting the latter, a spring for projecting said jaw, an operating bar for sliding the jaw against the resistance of said spring, a saw feed pawl, a support for said pawl pivotally mounted upon the bar, projections on the frame adapted to be engaged by said support to project and retract the pawl in the movement of the bar, saw filing means, and means controlled by said saw filing means for actuating the bar.

13. In a saw filing apparatus, the combination of a saw support having a fixed and a movable jaw, an operating bar for projecting said movable jaw, a supporting lever pivoted upon the bar and having an angularly projecting arm, a spring actuated pawl, carried by said lever, projections upon the frame of the machine coöperating with said arm to project and retract the pawl in the movement of the bar, saw filing means, and mechanism actuated by said saw filing means for operating the bar.

In testimony whereof, I affix my signature in presence of two witnesses.

FRANK J. MILLER.

Witnesses:
O. W. GOOD,
M. C. RHONE.